United States Patent
Feng et al.

(10) Patent No.: US 11,663,871 B2
(45) Date of Patent: May 30, 2023

(54) QUEUING METHOD, QUEUING SYSTEM AND READABLE STORAGE MEDIUM

(71) Applicant: BOE TECHNOLOGY GROUP CO., LTD., Beijing (CN)

(72) Inventors: Pengpeng Feng, Beijing (CN); Jiashuang Zong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 17/418,055

(22) PCT Filed: Dec. 29, 2020

(86) PCT No.: PCT/CN2020/140760
§ 371 (c)(1),
(2) Date: Jun. 24, 2021

(87) PCT Pub. No.: WO2021/169573
PCT Pub. Date: Sep. 2, 2021

(65) Prior Publication Data
US 2022/0335767 A1  Oct. 20, 2022

(30) Foreign Application Priority Data
Feb. 28, 2020  (CN) .......................... 202010127630.0

(51) Int. Cl.
*G07C 11/00*   (2006.01)
(52) U.S. Cl.
CPC .......... *G07C 11/00* (2013.01); *G07C 2011/04* (2013.01)

(58) Field of Classification Search
CPC .... G07C 11/00; G07C 2011/04; G06Q 10/02; G06Q 10/06
(Continued)

(56) References Cited

U.S. PATENT DOCUMENTS

| 9,116,513 B2 | 8/2015 | Ambrefe, Jr. et al. |
| 2014/0104034 A1 | 4/2014 | Ambrefe, Jr. et al. |
| 2021/0141666 A1* | 5/2021 | Small .................. H04L 63/1416 |

FOREIGN PATENT DOCUMENTS

| CN | 101216783 | * | 7/2008 |
| CN | 101216783 A | | 7/2008 |

(Continued)

OTHER PUBLICATIONS

International Search Report from PCT/CN2020/140760 dated Mar. 18, 2021.
(Continued)

*Primary Examiner* — Omar Casillashernandez
(74) *Attorney, Agent, or Firm* — Calfee, Halter & Griswold LLP

(57) ABSTRACT

The present disclosure relates to a queuing method, a queuing system and a readable storage medium, and relates to the field of computer technologies The queuing method includes: obtaining a service type required by a user; updating a service queue corresponding to the service type, and generating identification information corresponding to the user; controlling an issuing apparatus to issue a reminder device, and establishing a correspondence between the identification information and the reminder device; and in response to a number-calling notification from a number-calling device, enabling a corresponding reminder device to execute a reminder action according to a sequence of identification information corresponding to the service queue.

19 Claims, 5 Drawing Sheets

(58) Field of Classification Search
USPC .......................................................... 235/375
See application file for complete search history.

(56) References Cited

FOREIGN PATENT DOCUMENTS

| | | | |
|---|---|---|---|
| CN | 201622632 | U | 11/2010 |
| CN | 103150803 | A | 6/2013 |
| CN | 105006055 | A | 10/2015 |
| CN | 105788054 | * | 7/2016 |
| CN | 105788054 | A | 7/2016 |
| CN | 107125859 | A | 9/2017 |
| CN | 107767522 | A | 3/2018 |
| CN | 105788054 | B | 10/2018 |
| CN | 110264607 | A | 9/2019 |
| CN | 111311810 | A | 6/2020 |
| EP | 2860114 | A1 | 4/2015 |

OTHER PUBLICATIONS

Written Opinion from PCT/CN2020/140760 dated Mar. 18, 2021.
First Office Action from CN Application No. 202010127630.0 dated Jan. 26, 2021.
Second Office Action from CN Application No. 202010127630.0 dated Aug. 20, 2021.

* cited by examiner

QUEUING METHOD, QUEUING SYSTEM AND READABLE STORAGE MEDIUM

CROSS-REFERENCE

The present application is based upon International Application No. PCT/CN2020/140760, filed on Dec. 29, 2020, which claims the priority to the Chinese Patent Application NO. 202010127630.0, entitled "QUEUING METHOD, QUEUING SYSTEM AND READABLE STORAGE MEDIUM", filed on Feb. 28, 2020, the entire contents of which are hereby incorporated by reference.

TECHNICAL FIELD

The present disclosure relates to the field of computer technologies, and in particular, to a queuing method, a queuing system and a readable storage medium.

BACKGROUND

At present, when someone goes to a bank for services, it is necessary to get a paper barcode for queuing up. The staff calls a number through broadcast to remind a customer to go to a corresponding window for the services, and the paper barcode is returned to the window for destruction.

It should be noted that the information disclosed in the Background section above is only for enhancing the understanding of the background of the present disclosure, and thus may include information that does not constitute prior art known to those of ordinary skill in the art.

SUMMARY

The present disclosure provides a queuing method, a queuing system and a readable storage medium.

According to an aspect of the present disclosure, there is provided a queuing method, including:

obtaining a service type required by a user;

updating a service queue corresponding to the service type, and generating identification information corresponding to the user;

controlling an issuing apparatus to issue a reminder device, and establishing a correspondence between the identification information and the reminder device; and in response to a number-calling notification from a number-calling device, enabling a corresponding reminder device to execute a reminder action according to a sequence of identification information corresponding to the service queue.

In an exemplary embodiment of the present disclosure, before the updating the service queue corresponding to the service type, the queuing method further includes:

obtaining a user type of the user;

the updating the service queue corresponding to the service type includes:

updating a sub-queue corresponding to the user type in the service queue corresponding to the service type.

In an exemplary embodiment of the present disclosure, the obtaining the user type of the user includes:

obtaining identity information of the user;

sending the identity information to an identification apparatus; and receiving the user type of the user identified by the identification apparatus according to the identity information.

In an exemplary embodiment of the present disclosure, the service type includes a first service type; the service queue includes a first service queue corresponding to the first service type; and the user type includes a first user type and a second user type; the first service queue includes a first sub-queue corresponding to the first user type and a second sub-queue corresponding to the second user type; the number-calling notification includes a first number-calling notification and a second number-calling notification;

the in response to the number-calling notification from the number-calling device, enabling the corresponding reminder device to execute the reminder action according to the sequence of the identification information corresponding to the service queue includes:

determining whether the first sub-queue is empty when the first number-calling notification is received;

enabling the corresponding reminder device to execute the reminder action according to a sequence of identification information corresponding to the first sub-queue, when the first sub-queue is not empty; enabling the corresponding reminder device to execute the reminder action according to a sequence of identification information corresponding to the second sub-queue, when the first sub-queue is empty;

enabling the corresponding reminder device to execute the reminder action according to the sequence of the identification information corresponding to the second sub-queue when the second number-calling notification is received.

In an exemplary embodiment of the present disclosure, the enabling the corresponding reminder device to execute the reminder action according to the sequence of the identification information corresponding to the second sub-queue includes:

determining whether the second sub-queue is empty;

enabling the corresponding reminder device to execute the reminder action according to the sequence of the identification information corresponding to the second sub-queue, when the second sub-queue is not empty; enabling the corresponding reminder device to execute the reminder action according to the sequence of the identification information corresponding to the first sub-queue, when the second sub-queue is empty.

In an exemplary embodiment of the present disclosure, the service type further includes a second service type; the service queue further includes a second service queue corresponding to the second service type; the number-calling notification further includes a third number-calling notification;

the in response to the number-calling notification from the number-calling device, enabling the corresponding reminder device to execute the reminder action according to the sequence of the identification information corresponding to the service queue further includes:

enabling the corresponding reminder device to execute the reminder action according to a sequence of identification information corresponding to the second service queue when the third number-calling notification is received.

In an exemplary embodiment of the present disclosure, the enabling the corresponding reminder device to execute the reminder action according to the sequence of the identification information corresponding to the service queue includes:

sending an execution signal to the corresponding reminder device according to the sequence of the identification information corresponding to the service queue, so that the reminder device executes the reminder action; and receiving a feedback signal generated by the reminder device in response to the execution signal.

In an exemplary embodiment of the present disclosure, the reminder device includes a display component;

the enabling the corresponding reminder device to execute the reminder action according to the sequence of the identification information corresponding to the service queue further includes:

determining a number-calling device that sends out the number-calling notification, and generating a number of the number-calling device;

sending the number to the corresponding reminder device according to the sequence of the identification information corresponding to the service queue, so that the display component displays the number of the number-calling device.

In an exemplary embodiment of the present disclosure, the reminder device includes a display component, and the user type includes a target feature; the queuing method further includes:

sending display information corresponding to the target feature to a reminder device corresponding to identification information corresponding to each user in the service queue, so that the display component displays the display information.

In an exemplary embodiment of the present disclosure, the updating the service queue corresponding to the service type includes:

updating a corresponding service queue according to a time sequence in which the service type is received.

According to an aspect of the present disclosure, there is provided a queuing system, including:

a queuing apparatus, configured to execute any one of the aforementioned queuing methods;

an issuing apparatus, having multiple reminder devices, and configured to issue the reminder devices under control of the queuing apparatus;

a number-calling device, configured to send a number-calling notification to the queuing apparatus.

In an exemplary embodiment of the present disclosure, the queuing apparatus includes an obtaining circuit, and the obtaining circuit is configured to obtain the identity information of the user;

the queuing system also includes:

an identification apparatus, configured to identify the user type of the user according to the identity information, and send it to the obtaining circuit.

In an exemplary embodiment of the present disclosure, the reminder device includes:

a vibrating mechanism, and the reminder action includes executing a vibrating action.

In an exemplary embodiment of the present disclosure, the queuing apparatus includes:

a numbering device, configured to determine a number-calling device that sends out the number-calling notification, and generate a number of the number-calling device; and send the number to a corresponding reminder device according to a sequence of identification information corresponding to the service queue; and a pushing device, configured to send display information corresponding to the target feature of the user type to the reminder device corresponding to the identification information corresponding to each user in the service queue;

the reminder device includes:

a display component, configured to display the number and the display information.

In an exemplary embodiment of the present disclosure, the issuing apparatus includes:

a counting circuit, configured to determine a number of reminder devices that have been issued;

a comparison circuit, configured to compare the number of reminder devices that have been issued with a threshold value, and output an alarm signal when the number of reminder devices that have been issued is greater than the threshold value;

an alarm unit, configured to make an alarm in response to the alarm signal.

According to an aspect of the present disclosure, there is provided a readable storage medium on which a computer program is stored, and the computer program, when executed, implements any one of the queuing methods described above.

Other characteristics and advantages of the present disclosure will become apparent through the following detailed description, or partly learned through practice of the present disclosure.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without departing from the drawings described herein.

DETAILED DESCRIPTION

Figure 1:
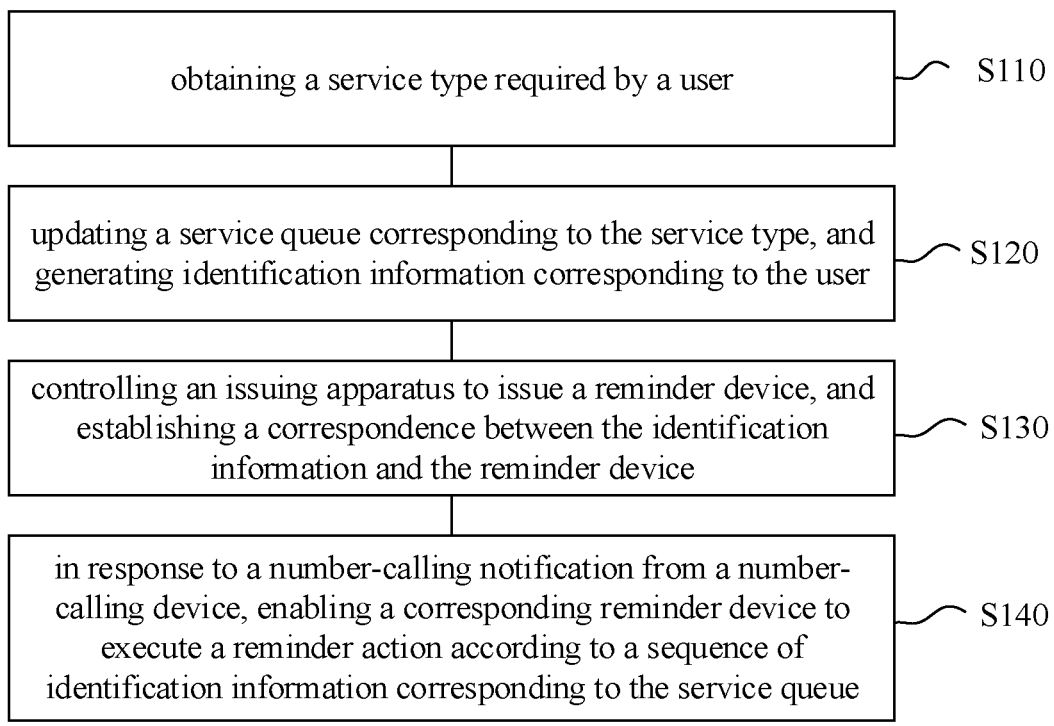
FIG. 1 is a flowchart of an embodiment of a queuing method of the present disclosure.

Example embodiments will now be described more fully with reference to the accompanying drawings. However, the embodiments may be implemented in a variety of forms and should not be construed as being limited to the examples set forth herein; rather, these embodiments are provided so that the present disclosure will be more complete so as to convey the idea of the exemplary embodiments to those skilled in this art. The same reference numerals in the drawings denote the same or similar parts, and the repeated description thereof will be omitted. In addition, the drawings are merely schematic representations of the present disclosure and are not necessarily drawn to scale.

The terms "one", "a", "the", and "said" are used to indicate that there are one or more elements/components or the like; the terms "include" and "have" are used to indicate an open meaning of including and means that there may be additional elements/components/etc. in addition to the listed elements/components/etc.

Embodiments of the present disclosure provide a queuing method, which may be used in a bank, but is not limited to this, and may also be used in government service center or other application scenarios that require queuing. As shown in FIG. 1, the queuing method includes step S110 to step S140:

in the step S110, a service type required by a user is obtained;

in the step S120, a service queue corresponding to the service type is updated, and identification information corresponding to the user is generated;

in the step S130, an issuing apparatus is controlled to issue a reminder device, and a correspondence between the identification information and the reminder device is established; and in the step S140, in response to a number-calling notification from a number-calling device, a corresponding reminder device is enabled to execute a reminder action according to a sequence of identification information corresponding to the service queue.

According to the queuing method of the embodiments of the present disclosure, the user may be added to the corresponding service queue according to the service type required by the user, and the reminder device may be issued to the user. During the waiting, the user may carry the reminder device with him. When a number is called through the number-calling device, each user may be directly reminded through the reminder device, and each user is called individually, avoiding the use of broadcast to call all users, which is beneficial to reduce noise caused by the broadcast. In addition, because the reminder may be sent directly to each user, the interference of the external environment noise to the user may be reduced to prevent miss the number calling.

The following describes individual steps of the queuing method in the embodiments of the present disclosure in detail.

As shown in FIG. 1, in the step S110, the service type required by the user is obtained.

The number of service types is multiple, depending on an application scenario. Taking a bank as an example, the service type may include a personal service, and a corporate service. Of course, it may also include other service types. In addition, the service type may also be classified according to other standards. For example, the service type may include a personal cash service, a personal non-cash service, a corporate service, and so on.

In response to an operation of the user on a queuing apparatus, a service type that the user needs to handle is obtained. For example, the queuing apparatus may have a touch display panel, and display icons of different service types on the touch display panel to facilitate the user to make a choice.

As shown in FIG. 1, in the step S120, the service queue corresponding to the service type is updated, and the identification information corresponding to the user is generated.

Each service type corresponds to one service queue, that is, users who require a same service type queue in a same service queue. For example, the personal service corresponds to a personal service queue, and the corporate service corresponds to a corporate service queue.

Updating the service queue refers to adding the user to the service queue corresponding to the service type according to the obtained service type of the user. Further, the updating the service queue corresponding to the service type includes: updating a corresponding service queue according to a time sequence of the received service type. In each service queue, sequences of individual users are arranged in a chronological sequence. For example, if a user selects the personal service, the user will be arranged last in the personal service queue, so as to update the personal service queue.

A form of the identification information is not specifically limited here.

Identification information of different users is different, and identification information of each user is unique. The identification information may include information about the service type of the service queue and a position of the user in the service queue.

As shown in FIG. 1, in the step S130, the issuing apparatus is controlled to issue the reminder device, and the correspondence between the identification information and the reminder device is established.

The issuing apparatus is capable of storing multiple reminder devices. Issuing the reminder device means unlocking the reminder device, so that the user can pick up the reminder device. For example, the issuing apparatus may have a casing and a controller, the casing is provided with containing grooves for accommodating reminder devices, and each reminder device is placed in each containing groove in a one-to-one correspondence. Each containing groove is provided with an electromagnet that may be attracted to and released from the reminder device, so that the electromagnet may be controlled by the controller to realize the locking and unlocking of the reminder device. A specific structure of the issuing apparatus is not specifically limited here, as long as it can unlock and lock the reminder device.

After the identification information is generated, the issuing apparatus may be controlled to issue the reminder device, that is, unlock the reminder device. In addition, the correspondence between the identification information and the issued reminder device is established, so that one reminder device corresponds to only one piece of the identification information, such as to correspond the user to the reminder device, and the reminder device corresponding to each user is unique. For example, each reminder device has a unique code, and the correspondence between the identification information and the reminder device may be a one-to-one mapping relationship between the identification information and the code.

As shown in FIG. 1, in the step S140, in response to the number-calling notification from the number-calling device, the corresponding reminder device is enabled to execute the reminder action according to the sequence of identification information corresponding to the service queue.

The number-calling notification may be generated by the number-calling device in response to an operation of the staff. When the number-calling notification is received, the reminder device corresponding to the identification information is enabled to perform the reminder action according to a service queue sequence and the above correspondence between the identification information and the reminder device. The reminder action may include vibration, and a manner of vibration may be continuous vibration or intermittent vibration, etc.; of course, the reminder action can also include light emission, and the specific form is not specifically limited here, as long as the user can perceive it.

For example, each service type is handled in at least one counter or window, and each counter is equipped with the number-calling device. For a counter that handles the personal service, after finishing the service of a user "Zhang X", a teller may operate the number-calling device to send out the number-calling notification, and a reminder device of a user "Li X" who is after "Zhang X" in the service queue vibrates, thereby reminding the user with this reminder device to go to the counter for service.

In some embodiments of the present disclosure, the in response to the number-calling notification from the number-calling device, enabling the corresponding reminder device to execute the reminder action according to the sequence of the identification information corresponding to the service queue, that is, the step S140 includes:

sending an execution signal to the corresponding reminder device according to the sequence of the identification information corresponding to the service queue, so that the reminder device executes the reminder action; and receiving a feedback signal generated by the reminder device in response to the execution signal.

When the feedback signal is received, it may be determined that the reminder device has received the execution signal. For example, a microprocessor architecture may be used to implement the aforementioned functions of sending the execution signal and receiving the feedback signal.

Further, while the user is reminded through the reminder device, the reminder device may be used for indicating to the user the window or counter for the required service type. In some embodiments of the present disclosure, the reminder device includes a display component, which may be a liquid crystal display panel, an organic light-emitting diode (OLED) display panel or other display devices. The step S140 further includes step S1410 and step S1420.

In the step S1410, a number-calling device that sends out the number-calling notification is determined, and a number of the number-calling device is generated.

For example, in a business hall of the bank, one number-calling device is placed at each counter, and each number-calling device may communicate with the queuing apparatus through different ports, so that the number-calling device may be determined by determining a port that has received the number-calling notification, and the number-calling device is numbered. Alternatively, the number-calling notification may include unique identification information corresponding to the number-calling device that sends out the number-calling notification, such as to determine the number of the number-calling device based on the identification information of the number-calling notification.

In the step S1420, the number is sent to the corresponding reminder device according to the sequence of the identification information corresponding to the service queue, so that the display component displays the number of the number-calling device.

For example, a number is displayed on the counter of each window. This number is the number of the calling device. The reminder device may display the number of the counter or window where the number-calling device that sends out the number-calling notification is located while executing the reminder action, so that the user may directly go to the corresponding counter or window for service.

Figure 2:
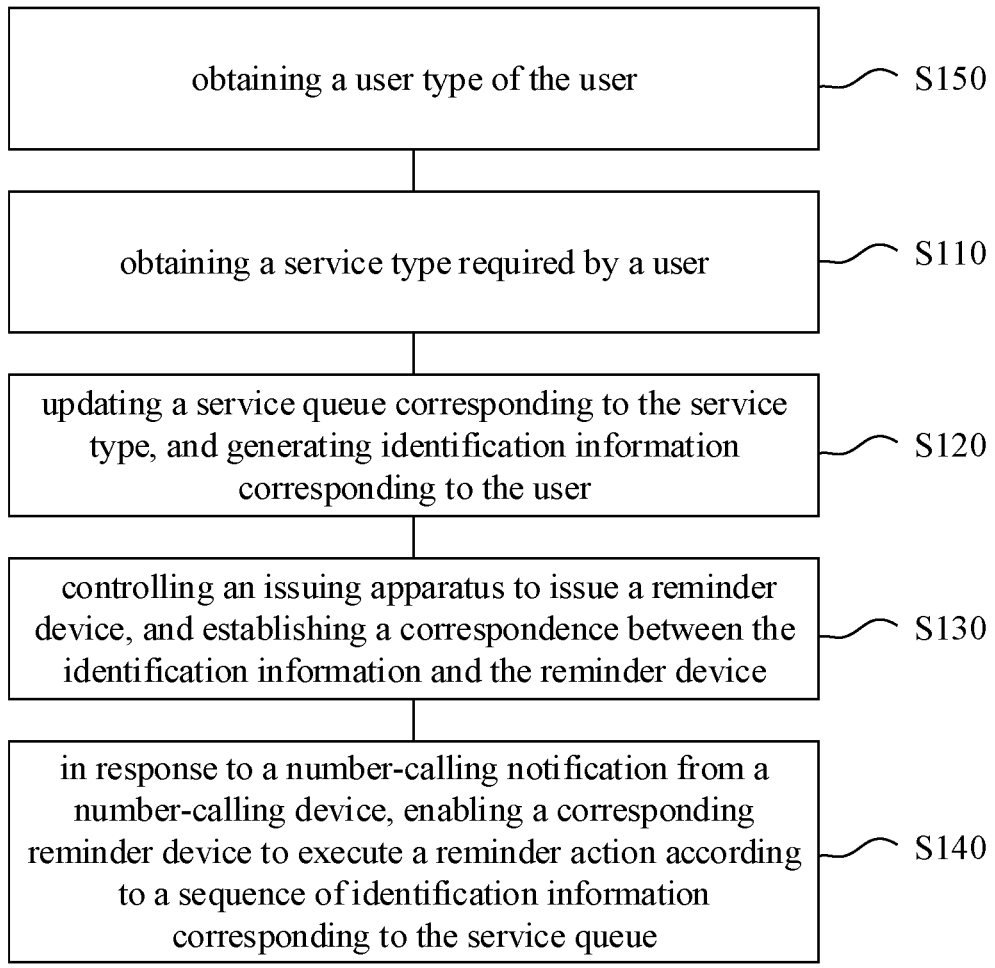
FIG. 2 is a flowchart of another embodiment of the queuing method of the present disclosure.

Further, before the updating the service queue corresponding to the service type, that is, before the step S120, as shown in FIG. 2, the queuing method of the present disclosure may further include step S150.

In the step S150, a user type of the user is obtained.

There are multiple user types, such as an ordinary user, a VIP user, and of course, other types may also be included.

Figure 3:
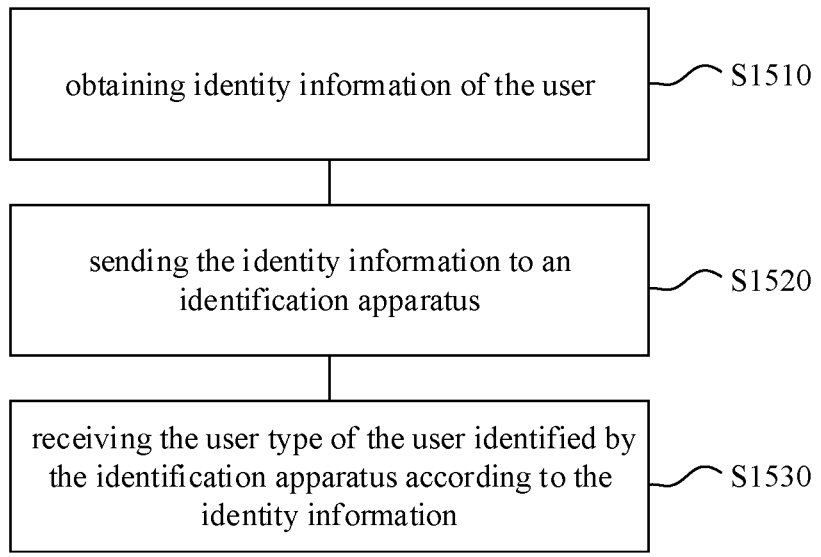
FIG. 3 is a flowchart of step S150 in an embodiment of a queuing method of the present disclosure.

In some embodiments of the present disclosure, as shown in FIG. 3, the obtaining the user type of the user, that is, the step S150, includes step S1510-step S1530.

In the step S1510, identity information of the user is obtained.

The identity information of the user may be identified through card swiping, face recognition, or manual input. The identity information may be ID card information, bank card number, etc., depending on a specific application scenario.

In the step S1520, the identity information is sent to an identification apparatus.

The identification apparatus may be a remote server, which may store the identity information and the user type of each user, and the user type and the identity information have a one-to-one correspondence. Taking the bank as an example, the identification apparatus may be a customer relationship management (CRM) system, and one piece of identity information may correspond to the ordinary user or the VIP user. The obtained identity information of the user may be sent to the identification apparatus for determining the user type.

In the step S1530, the user type of the user identified by the identification apparatus according to the identity information is received.

The identification apparatus may determine the user type according to the received identity information and a pre-stored mapping relationship between the identity information and the user type. For example, the identification apparatus may determine that the user type of the user "Li X" is the ordinary user according to the identity information of the user "Li X".

Correspondingly, as shown in FIG. 2, the updating the service queue corresponding to the service type, that is, the step S120, includes:

updating a sub-queue corresponding to the user type in the service queue corresponding to the service type.

The service queue of each service type may include multiple sub-queues, and each sub-queue corresponds to one user type. For example, the service queue of the personal service type includes a sub-queue corresponding to ordinary users and a sub-queue corresponding to VIP users. If the user "Li X" selects the personal service type and the user type is the ordinary user, then "Li X" is arranged in the sub-queue of ordinary users in the service queue of the personal service type. As a result, the user may be further classified to improve work efficiency.

In some embodiments of the present disclosure, the service type may include a first service type, and the service queue may include a first service queue corresponding to the first service type; the user type may include a first user type and a second user type; the first service queue may include a first sub-queue corresponding to the first user type and a second sub-queue corresponding to the second user type; the number-calling notification may include a first number-calling notification and a second number-calling notification.

The in response to the number-calling notification from the number-calling device, enabling the corresponding reminder device to execute the reminder action according to the sequence of the identification information corresponding to the service queue, that is, the step S140, includes step 210-step 230.

In the step 210, it is determined whether the first sub-queue is empty when the first number-calling notification is received;

The first number-calling notification may be a number-calling notification sent out by the first number-calling device, which may be used to call users in the first sub-queue. The first sub-queue being empty means that there is no user queued in the first sub-queue, and that the first sub-queue being not empty means that there are users queued in the first sub-queue.

In the step 220, when the first sub-queue is not empty, the corresponding reminder device is enabled to execute the reminder action according to a sequence of identification information corresponding to the first sub-queue; when the first sub-queue is empty, the corresponding reminder device is enabled to execute the reminder action according to a sequence of identification information corresponding to the second sub-queue.

When the first number-calling notification is received and the first sub-queue is empty, it means that there is no user queued in the first sub-queue. At this time, in order to improve work efficiency, a corresponding user may be reminded by the reminder device according to a sequence of the second sub-queue, so that the first number-calling notification may also be used to remind users in the second sub-queue, thereby fully utilizing the idle counter, and avoiding resource waste. Specifically, if the first sub-queue is not empty, the corresponding user may be reminded by the reminder device according to a sequence of the first sub-queue, instead of calling the users in the second sub-queue through the first number-calling device. In other words, the users in the first sub-queue have priority over the users in the second sub-queue. The counter or window where the first calling device is located may be used to serve the users in the first sub-queue. It may also serve the users in the second sub-queue when the first sub-queue is empty.

In the step 230, when the second number-calling notification is received, the corresponding reminder device is enabled to execute the reminder action according to the sequence of the identification information corresponding to the second sub-queue The second number-calling notification may be a number-calling notification sent out by the second number-calling device. The second number-calling device and the first call device are located at different counters. The second number-calling notification may only be used for reminding the users in the second sub-queue through the reminder device without reminding the users of the first sub-queue. That is, the counter or window where the second number-calling device is located is only used to serve the users in the second sub-queue, but is not used to serve the users in the first sub-queue.

Further, the step S230 may include step S2310 and step S2320.

In the step S2310, it is determine whether the second sub-queue is empty.

The second sub-queue being empty means that there are no users queued in the second sub-queue. The second sub-queue being not empty means that there are users queued in the second sub-queue.

In the step S2320, when the second sub-queue is not empty, the corresponding reminder device is enabled to execute the reminder action according to the sequence of the identification information corresponding to the second sub-queue; when the second sub-queue is empty, the corresponding reminder device is enabled to execute the reminder action according to the sequence of the identification information corresponding to the first sub-queue.

When the second number-calling notification is received and the second sub-queue is empty, it means that there are no users queued in the second sub-queue. At this time, in order to improve work efficiency and increase the priority of users in the first sub-queue, a corresponding user may be reminded by the reminder device according to a sequence of the first sub-queue, so that the second number-calling notification may also be used to remind users in the first sub-queue. Specifically, if the second sub-queue is not empty, the corresponding user may be reminded by the reminder device according to a sequence of the second sub-queue, instead of calling the users in the first sub-queue through the first number-calling device. In other words, the users in the first sub-queue have priority over the users in the second sub-queue. The counter or window where the second number-calling device is located may be used to serve the users in the first sub-queue. It may also serve the users in the first sub-queue when the second sub-queue is empty.

Further, the above-mentioned service type may also include a second service type; the service queue also includes a second service queue corresponding to the second service type; and the number-calling notification also includes a third number-calling notification;

The in response to the number-calling notification from the number-calling device, enabling the corresponding reminder device to execute the reminder action according to the sequence of the identification information corresponding to the service queue, that is, the step S140, may further include:

In step S240, when the third number-calling notification is received, the corresponding reminder device is enabled to execute the reminder action according to a sequence of identification information corresponding to the second service queue.

The third number-calling notification may be a number-calling notification sent out by the third number-calling device. The third number-calling device is located at a different counter from the counters where the first number-calling device and the second number-calling device are located. The third number-calling device is only used for reminding the users of the second service queue through the reminder device without reminding the users of the first service queue. That is, the counter or window where the third calling device is located is only used to serve the users of the second service queue, but not used to serve the users of the first service queue.

Exemplarily, the first service type is the personal service, the second service type is the corporate service, the first user type is the VIP user, and the second user type is the ordinary user. The first number-calling device is a number-calling device of a special counter for the VIP user of the personal service, the second number-calling device is a number-calling device of a special counter for the ordinary user, and the third number-calling device is a number-calling device of a special counter for the corporate service.

At work, for the VIP user for the personal service, the personal service may be handled at the counter where the first number-calling device is located; for the ordinary user for the personal service, the personal service may be handled at the counter where the second number-calling device is located. In addition, if the VIP user's queue is empty, the counter where the first number-calling device is located may also be used to handle the personal service for the ordinary users; if the ordinary user's queue is empty, the counter where the second number-calling device is located may also be used to handle the personal service for the VIP user, thereby reducing the waiting time of the VIP user.

For the user for the corporate service, the corporate service may be handled at the counter where the third number-calling device is located, which does not affect the personal service.

In some embodiments of the present disclosure, when the first number-calling notification is received and the first sub-queue is empty, the corresponding reminder device is enabled to execute the reminder action according to the sequence of the identification information corresponding to the second service queue. When the first number-calling notification is received and the first sub-queue and the second service queue are empty, the corresponding reminder device is enabled to execute the reminder action according to the sequence of the identification information corresponding to the second sub-queue, so that a priority of the user in the first sub-queue is higher than that of the user in the second service queue, and the priority of the user in the second service queue is higher than that of the user in the second sub-queue. For example, a user in the first sub-queue is the VIP user for the personal service, a user in the second service queue is the user for the corporate service, and a user in the second sub-queue is the ordinary user for the personal service.

Further, in order to display more information on the reminder device so as to display information to the user, in some embodiments of the present disclosure, the user type may include a target feature, and the target feature may be a risk preference (a result of the bank's risk evaluation of the user, which is not a subjective preference of the user) or another feature, and the queuing method of the embodiments of the present disclosure may further include step S160 and step S170.

In the step S160, display information corresponding to the target feature is sent to a reminder device corresponding to identification information corresponding to each user in the service queue, so that the display component displays the display information.

In the step S170, display information displayed on the reminder device may be pushed to the user according to the target feature. The display information may be wealth management product information. A mapping relationship between the display information and the target feature may be established in advance, so that the display information may be pushed to the reminder device according to the target feature, in order to be displayed through the display component of the reminder device.

For example, the target feature is the risk preference of the user. For example, the risk preference of "Li X" is R3, and a risk level of the corresponding wealth management product is not higher than R3. Therefore, information of wealth management products whose risk level is not higher than R3 may be pushed to the reminder device of "A" as the display information for the display component of the reminder device for display, which facilitates the user to read.

It should be noted that although the various steps of the method of the present disclosure are described in a particular order in the figures, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on.

Figure 4:
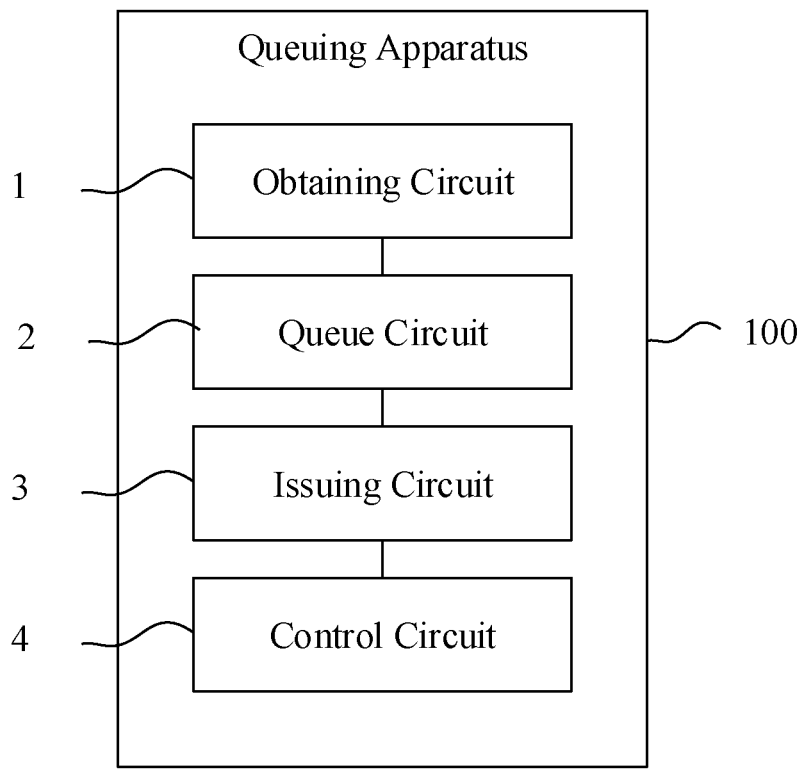
FIG. 4 is a schematic diagram of an embodiment of a queuing apparatus of the present disclosure.

The embodiments of the present disclosure also provide a queuing apparatus, which is configured to execute the queuing method of any of the foregoing embodiments. Specifically, as shown in FIG. 4, the queuing apparatus 100 may include an obtaining circuit 1, a queue circuit 2, an issuing circuit 3 and a control circuit 4, of which:

The obtaining circuit 1 is configured to obtain a service type required by a user.

The queue circuit 2 is configured to update a service queue corresponding to the service type and generate identification information corresponding to the user.

The issuing circuit 3 is configured to control the issuing equipment to issue a reminder device when receiving the identification information, and establish a corresponding relationship between the identification information and the reminder device.

The control circuit 4 is configured to, in response to a number-calling notification from a number-calling device, enable a corresponding reminder device to execute a reminder action according to a sequence of identification information corresponding to the service queue.

For the specific details and beneficial effects of the queuing apparatus 100 in the embodiments of the present disclosure, reference may be made to the above-mentioned implementations of the queuing method, which will not be repeated here.

Figure 5:
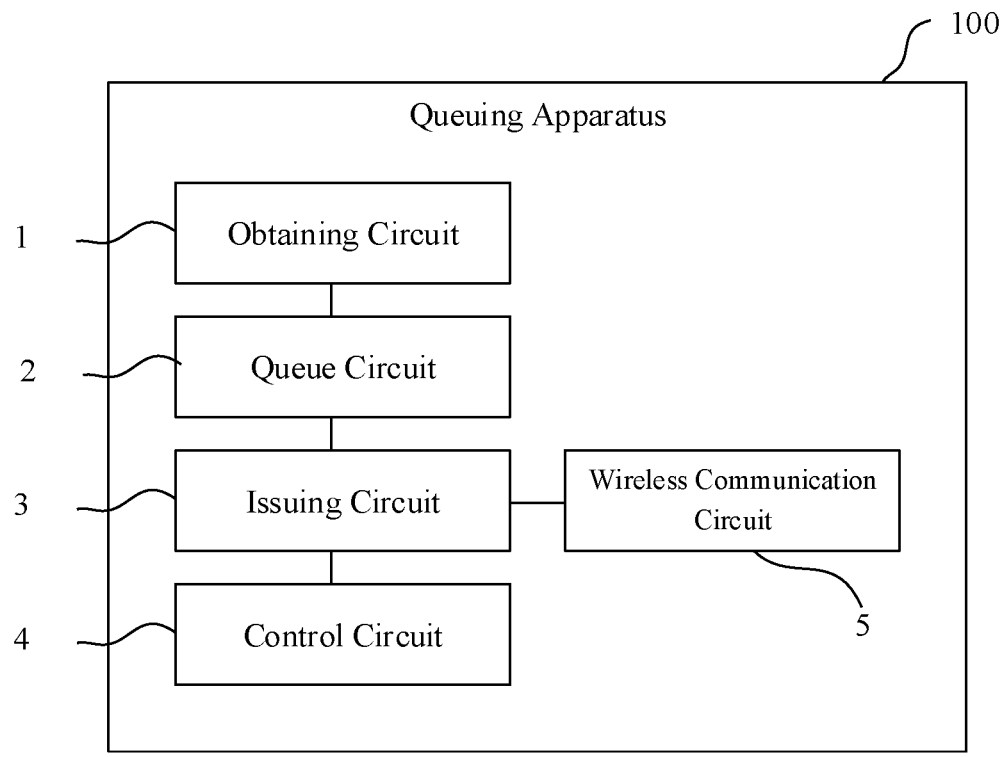
FIG. 5 is a schematic diagram of another embodiment of a queuing apparatus of the present disclosure.

Further, as shown in FIG. 5, in some embodiments of the present disclosure, the queuing apparatus 100 further includes a wireless communication circuit 5, which may be configured to wirelessly communicate with the issuing apparatus and the reminder device.

In some embodiments of the present disclosure, the wireless communication circuit 5 includes a radio frequency circuit and a communication control circuit. The control circuit may control the radio frequency circuit to communicate with the issuing apparatus and the reminder device by means of radio frequency communication. Further, communication may be realized by means of serial communication. Of course, wireless or wired communication may also be executed through communication manners, which is not specifically limited here. Further, the wireless communication circuit 5 may also include a communication power supply to supply power to the communication control circuit and the radio frequency circuit.

In addition, it is also possible to communicate with the identification apparatus through the wireless communication circuit 5.

The wireless communication circuit 5 may adopt a microprocessor architecture, so that while sending a signal, it can receive a feedback signal, can transmit a text, a picture and other information, and can communicate with multiple reminder devices 201 at the same time.

The wireless communication circuit 5 may be integrated with the obtaining circuit 1, the queue circuit 2, the issuing circuit 3, and the control circuit 4 on a same circuit board, or these components may be separately arranged, which is not specifically limited here.

Figure 6:
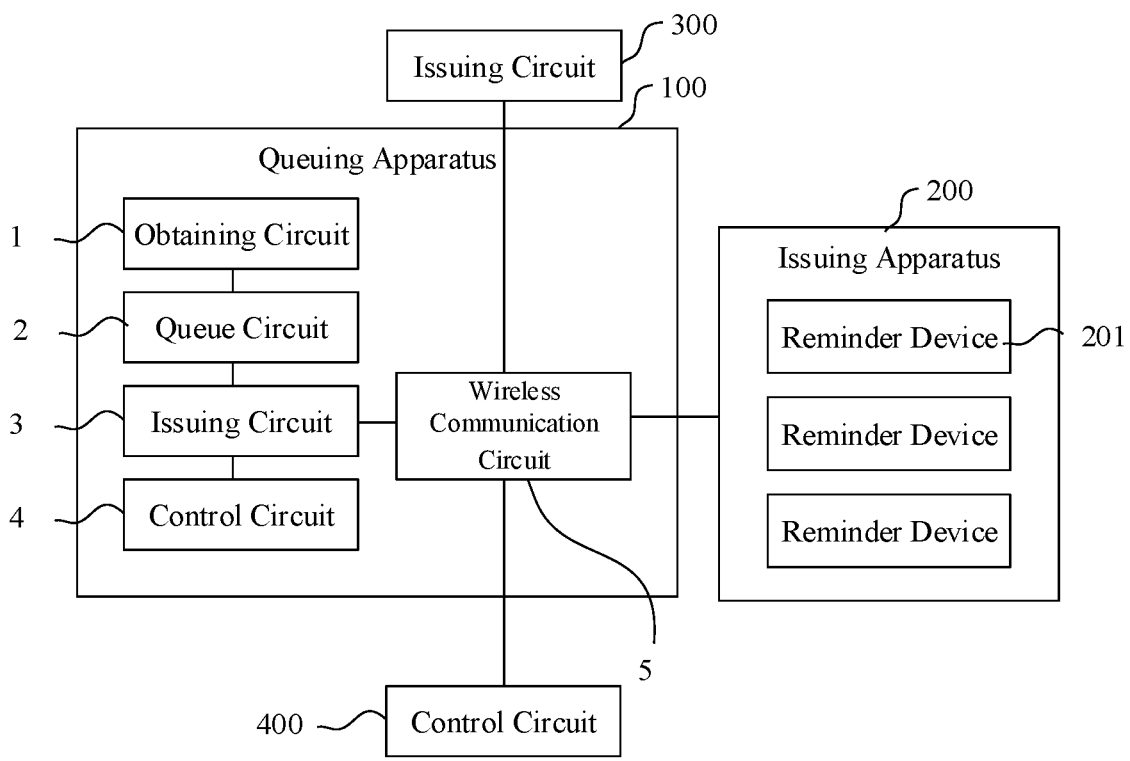
FIG. 6 is a schematic diagram of an embodiment of a queuing system of the present disclosure.

The embodiments of the present disclosure also provide a queuing system. As shown in FIG. 6, the queuing system may include a queuing apparatus 100, a issuing apparatus 200, and a number-calling device 300.

The queuing apparatus 100 is configured to execute the queuing method of any of the foregoing embodiments.

The issuing apparatus 200 has multiple reminder devices 201, and is configured to issue the reminder devices 201 under control of the queuing apparatus 100.

The number-calling device 300 is configured to send a number-calling notification to the queuing apparatus 100.

For the beneficial effects of the queuing system of the embodiments of the present disclosure, reference may be made to the implementations of the queuing method, which will not be described in detail here.

The following is a detailed description of each part of the queuing system of the embodiments of the present disclosure:

For the queuing apparatus 100, reference may be made to the implementations of the above queuing method for details, which will not be described in detail here.

As shown in FIG. 6, the multiple reminder devices 201 of the issuing apparatus 200 may be locked and unlocked. For example, the issuing apparatus 200 may have a casing and a controller, the casing is provided with containing grooves for accommodating reminder devices 201, and each reminder device 201 is placed in each containing groove in a one-to-one correspondence. Each containing groove is provided with an electromagnet that may be attracted to and released from the reminder device 201, so that the electromagnet may be controlled by the controller to realize the locking and unlocking of the reminder device 201. A specific structure of the issuing apparatus is not specifically limited here, as long as it can unlock and lock the reminder device.

Figure 7:
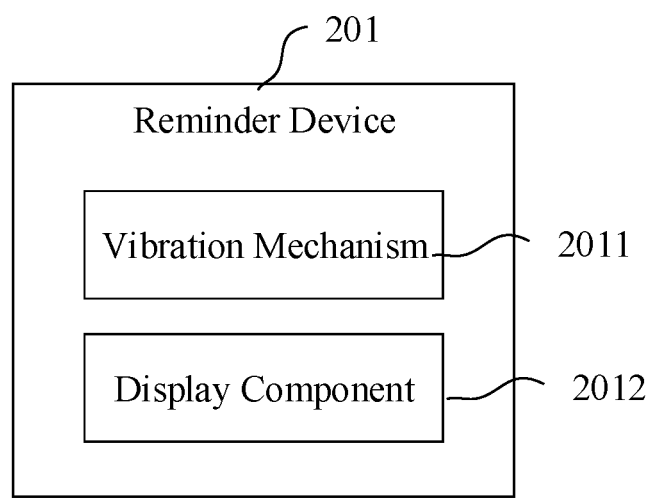
FIG. 7 is a schematic diagram of a reminder device in an embodiment of a queuing system of the present disclosure.

In some embodiments of the present disclosure, as shown in FIG. 7, the reminder device 201 includes a vibration mechanism 2011, and executing the reminder action includes executing a vibration action. For example, the vibration mechanism may include a vibration motor, and the reminder device 201 may be vibrated by controlling the vibration of the vibration motor.

In some embodiments of the present disclosure, as shown in FIG. 7, the queuing apparatus 100 may include a numbering device, and the numbering device may be configured to a number-calling device that sends out the number-calling notification and generate a number of the number-calling device; and the numbering device may be configured to send the number to the corresponding reminder device according to the identification information corresponding to the service queue.

Further, the queuing apparatus 100 may include a pushing device, configured to send display information corresponding to the target feature of the user type to the reminder device corresponding to the identification information corresponding to each user in the service queue.

The reminder device 201 may further include a display component 2012, which may be configured to display the number of the number-calling device 300 and the display information sent by the queuing apparatus 100. For the specific details of the display number and display information, please refer to the implementations of the queuing method, which will not be repeated here.

Further, in order to facilitate the timely recovery of the reminder device 210, the issuing apparatus 200 may also include a counting circuit, a comparison circuit and an alarm unit, among which:

The counting circuit can determine the number of reminder devices 201 that have been issued For example, each containing groove may be provided with a sensor for sensing the reminder device 201, so as to determine the number of reminder devices 201.

The comparison circuit can compare the number of reminder devices 201 that have been issued with a threshold value, and output an alarm signal when the number of reminder devices 201 that have been issued is greater than the threshold value.

The alarm unit can make an alarm in response to the alarm signal.

A manner for making the alarm may include making an alarm sound or emitting light. For example, the alarm unit may include at least one of a buzzer and an alarm light, and of course, it may also be other devices capable of emitting sound and light. The alarm light may be a LED light or other light-emitting devices.

When the alarm unit makes the alarm, it means that the number of reminder devices 201 in the issuing apparatus 200 is small. At this time, the staff may recycle the reminder devices 201 after use and put them in the issuing apparatus 200 again. Of course, when the alarm unit does not make the alarm, the reminder devices 201 may also be recycled.

As shown in FIG. 6, the number-calling device 300 is used for sending a number-calling notification to the queuing apparatus 100. A working process of the queuing apparatus 100 after receiving the number-calling notification can refer to the implementation of the queuing method, which will not be described in detail here. For example, the number-calling device 300 may have a number-calling button, and each time the number-calling button is pressed, a number-calling notification is sent out, and the corresponding reminder device 201 is enabled to execute the reminder action according to the sequence of the identification information corresponding to the service queue.

In some embodiments of the present disclosure, as shown in FIG. 6, the obtaining circuit 1 of the queuing apparatus 100 is also configured to obtain the user's identity information. The queuing system may also include an identification apparatus 400, which may be configured to identify the user type of the user according to the identity information, and send it to the obtaining circuit 1. For example, the identification apparatus 400 may be the customer relationship management system of the bank. For the working principles of the identification apparatus 400 and the queuing apparatus 100, please refer to the implementation of the queuing method, which will not be repeated here.

The following takes the process of the user "Li X" for service in the bank as an example to illustrate the queuing system of the embodiments of the present disclosure:

In step S200, the user "Li X" arrives at a business hall of a bank branch;

In step S210, "Li X" swipes the ID card or bank card on the queuing apparatus 100;

In step S220, "Li X" selects a service type on the queuing apparatus 100, thereby entering a service queue;

In step S230, the issuing apparatus 200 issues a reminder device 200 corresponding to "Li X";

In step S240, "Li X" takes away the reminder device 200;

In step S250, a teller operates the number-calling device 300 to send out a number-calling notification before handling the service for a user;

In step S260, when the reminder device 201 of "Li X" executes the reminder action, "Li X" goes to the counter or window corresponding to number information displayed on the reminder device 201 for service, and returns the reminder device 201.

In step S270, the bank staff recycles the reminder devices 201 returned by "Li X" and puts it back into the issuing apparatus 200.

The embodiments of the present disclosure also provide a readable storage medium on which a computer program is stored, and the computer program, when executed, implements the queuing method of any embodiment. In some embodiments, various aspects of the present disclosure may also be implemented in a form of a program product, which includes a program code, and when the program product is run on a terminal device, the program code is configured to enable the terminal device to execute the steps according to various exemplary embodiments of the present disclosure described in the above-mentioned queuing method of the present specification.

Figure 8:
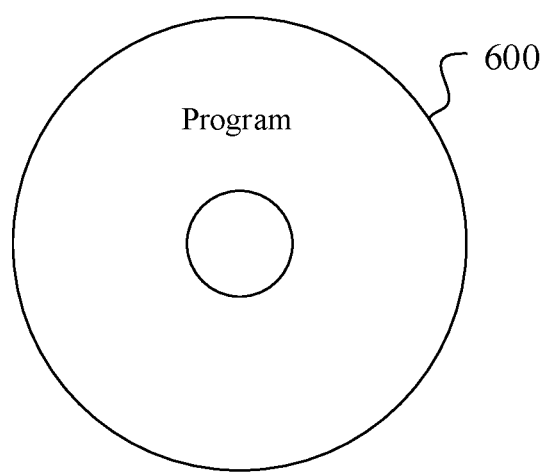
FIG. 8 is a schematic diagram of an embodiment of a readable storage medium of the present disclosure.

As shown in FIG. 8, a program product 600 for implementing the above method according to an embodiment of the present disclosure is described. The program product 600 can use a portable compact disc read-only memory (CD-ROM) and include the program code, which may run on a terminal device, for example, personal computer. However, the program product of the present disclosure is not limited thereto. In this document, the readable storage medium 600 may be tangible medium containing or storing program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media includes: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as a part of a carrier wave, which carries readable program code. Such a propagated data signal may take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical cable, RF, etc., or any suitable combination of the foregoing.

The program code for executing the operations of the present disclosure may be written in any combination of one or more programming languages, which include object-oriented programming languages, such as Java, C++, etc. and further include conventional procedural programming language, such as 'C' or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to execute the methods according to embodiments in the present disclosure.

Other embodiments of the present disclosure will be apparent to those skilled in the art after consideration of the specification and practice of the present disclosure disclosed here. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

What is claimed is:

1. A queuing method, comprising:
   obtaining a service type required by a user;
   updating a service queue corresponding to the service type, and generating identification information corresponding to the user;
   controlling an issuing apparatus to issue a reminder device, and establishing a correspondence between the identification information and the reminder device; and
   in response to a number-calling notification from a number-calling device, enabling a corresponding reminder device to execute a reminder action according to a sequence of identification information corresponding to the service queue,
   wherein the controlling an issuing apparatus to issue a reminder device, and establishing a correspondence between the identification information and the reminder device comprises:
   determining a number of reminder devices that have been issued;
   comparing the number of reminder devices that have been issued with a threshold value, and outputting an alarm signal when the number of reminder devices that have been issued is greater than the threshold value; and
   making an alarm in response to the alarm signal.

2. The queuing method according to claim 1, wherein, before the updating the service queue corresponding to the service type, the queuing method further comprises:
   obtaining a user type of the user;
   the updating the service queue corresponding to the service type comprises:
   updating a sub-queue corresponding to the user type in the service queue corresponding to the service type.

3. The queuing method according to claim 2, wherein the obtaining the user type of the user comprises:
   obtaining identity information of the user;
   sending the identity information to an identification apparatus; and
   receiving the user type of the user identified by the identification apparatus according to the identity information.

4. The queuing method according to claim 2, wherein the service type comprises a first service type; the service queue comprises a first service queue corresponding to the first service type; the user type comprises a first user type and a second user type; the first service queue comprises a first sub-queue corresponding to the first user type and a second sub-queue corresponding to the second user type; and the number-calling notification comprises a first number-calling notification and a second number-calling notification;

the in response to the number-calling notification from the number-calling device, enabling the corresponding reminder device to execute the reminder action according to the sequence of the identification information corresponding to the service queue comprises:

determining whether the first sub-queue is empty when the first number-calling notification is received;

enabling the corresponding reminder device to execute the reminder action according to a sequence of identification information corresponding to the first sub-queue, when the first sub-queue is not empty; enabling the corresponding reminder device to execute the reminder action according to a sequence of identification information corresponding to the second sub-queue, when the first sub-queue is empty; and enabling the corresponding reminder device to execute the reminder action according to the sequence of the identification information corresponding to the second sub-queue when the second number-calling notification is received.

5. The queuing method according to claim 4, wherein, the enabling the corresponding reminder device to execute the reminder action according to the sequence of the identification information corresponding to the second sub-queue comprises:

determining whether the second sub-queue is empty; and enabling the corresponding reminder device to execute the reminder action according to the sequence of the identification information corresponding to the second sub-queue, when the second sub-queue is not empty; enabling the corresponding reminder device to execute the reminder action according to the sequence of the identification information corresponding to the first sub-queue, when the second sub-queue is empty.

6. The queuing method according to claim 4, wherein the service type further comprises a second service type; and the service queue further comprises a second service queue corresponding to the second service type; the number-calling notification further comprises a third number-calling notification;

the in response to the number-calling notification from the number-calling device, enabling the corresponding reminder device to execute the reminder action according to the sequence of the identification information corresponding to the service queue further comprises:

enabling the corresponding reminder device to execute the reminder action according to a sequence of identification information corresponding to the second service queue when the third number-calling notification is received.

7. The queuing method according to claim 1, wherein, the enabling the corresponding reminder device to execute the reminder action according to the sequence of the identification information corresponding to the service queue comprises:

sending an execution signal to the corresponding reminder device according to the sequence of the identification information corresponding to the service queue, so that the reminder device executes the reminder action; and receiving a feedback signal generated by the reminder device in response to the execution signal.

8. The queuing method according to claim 1, wherein the reminder device comprises a display component;

the enabling the corresponding reminder device to execute the reminder action according to the sequence of the identification information corresponding to the service queue further comprises:

determining a number-calling device that sends out the number-calling notification, and generating a number of the number-calling device; and sending the number to the corresponding reminder device according to the sequence of the identification information corresponding to the service queue, so that the display component displays the number of the number-calling device.

9. The queuing method according to claim 1, wherein the reminder device comprises a display component, and the user type comprises a target feature; the queuing method further comprises:

sending display information corresponding to the target feature to a reminder device corresponding to identification information corresponding to each user in the service queue, so that the display component displays the display information.

10. The queuing method according to claim 1, wherein the updating the service queue corresponding to the service type comprises:

updating a corresponding service queue according to a time sequence in which the service type is received.

11. A queuing system, comprising:

a queuing apparatus, configured to execute a queuing method comprising: obtaining a service type required by a user; updating a service queue corresponding to the service type, and generating identification information corresponding to the user; controlling an issuing apparatus to issue a reminder device, and establishing a correspondence between the identification information and the reminder device; and in response to a number-calling notification from a number-calling device, enabling a corresponding reminder device to execute a reminder action according to a sequence of identification information corresponding to the service queue;

the issuing apparatus, having multiple reminder devices, and configured to issue the reminder devices under control of the queuing apparatus; and the number-calling device, configured to send the number-calling notification to the queuing apparatus, wherein the issuing apparatus comprises:

a counting circuit, configured to determine a number of reminder devices that have been issued;

a comparison circuit, configured to compare the number of reminder devices that have been issued with a threshold value, and output an alarm signal when the number of reminder devices that have been issued is greater than the threshold value; and an alarm unit, configured to make an alarm in response to the alarm signal.

12. The queuing system according to claim 11, wherein the queuing apparatus comprises an obtaining circuit, and the obtaining circuit is configured to obtain the identity information of the user;

the queuing system also comprises:

an identification device, configured to identify the user type of the user according to the identity information, and send it to the obtaining circuit.

13. The queuing system according to claim 11, wherein the reminder device comprises:

a vibrating mechanism, and the reminder action comprises executing a vibrating action.

14. The queuing system according to claim 11, wherein the queuing apparatus comprises:
- a numbering device, configured to determine a number-calling device that sends out the number-calling notification, and generate a number of the number-calling device; and send the number to a corresponding reminder device according to the sequence of the identification information corresponding to the service queue; and
- a pushing device, configured to send display information corresponding to the target feature of the user type to the reminder device corresponding to the identification information corresponding to each user in the service queue;
- the reminder device comprises:
- a display component, configured to display the number and the display information.

15. A non-volatile readable storage medium having a computer program stored thereon, wherein the computer program, when executed, implements the queuing method according to claim 1.

16. The queuing system according to claim 11, wherein the queuing apparatus is further configured to, before the updating the service queue corresponding to the service type:
- obtain a user type of the user; and
- update a sub-queue corresponding to the user type in the service queue corresponding to the service type.

17. The queuing system according to claim 16, wherein the queuing apparatus is further configured to:
- obtain identity information of the user;
- send the identity information to an identification apparatus; and
- receive the user type of the user identified by the identification apparatus according to the identity information.

18. The queuing system according to claim 16, wherein the service type comprises a first service type; the service queue comprises a first service queue corresponding to the first service type; the user type comprises a first user type and a second user type; the first service queue comprises a first sub-queue corresponding to the first user type and a second sub-queue corresponding to the second user type; and the number-calling notification comprises a first number-calling notification and a second number-calling notification;

the queuing apparatus is further configured to:
- determine whether the first sub-queue is empty when the first number-calling notification is received;
- enable the corresponding reminder device to execute the reminder action according to a sequence of identification information corresponding to the first sub-queue, when the first sub-queue is not empty; enable the corresponding reminder device to execute the reminder action according to a sequence of identification information corresponding to the second sub-queue, when the first sub-queue is empty; and
- enable the corresponding reminder device to execute the reminder action according to the sequence of the identification information corresponding to the second sub-queue when the second number-calling notification is received.

19. The queuing system according to claim 18, wherein, the queuing apparatus is further configured to:
- determine whether the second sub-queue is empty; and
- enable the corresponding reminder device to execute the reminder action according to the sequence of the identification information corresponding to the second sub-queue, when the second sub-queue is not empty; enable the corresponding reminder device to execute the reminder action according to the sequence of the identification information corresponding to the first sub-queue, when the second sub-queue is empty.

* * * * *